INVENTOR.
STEVE ANDREWS
Attorney

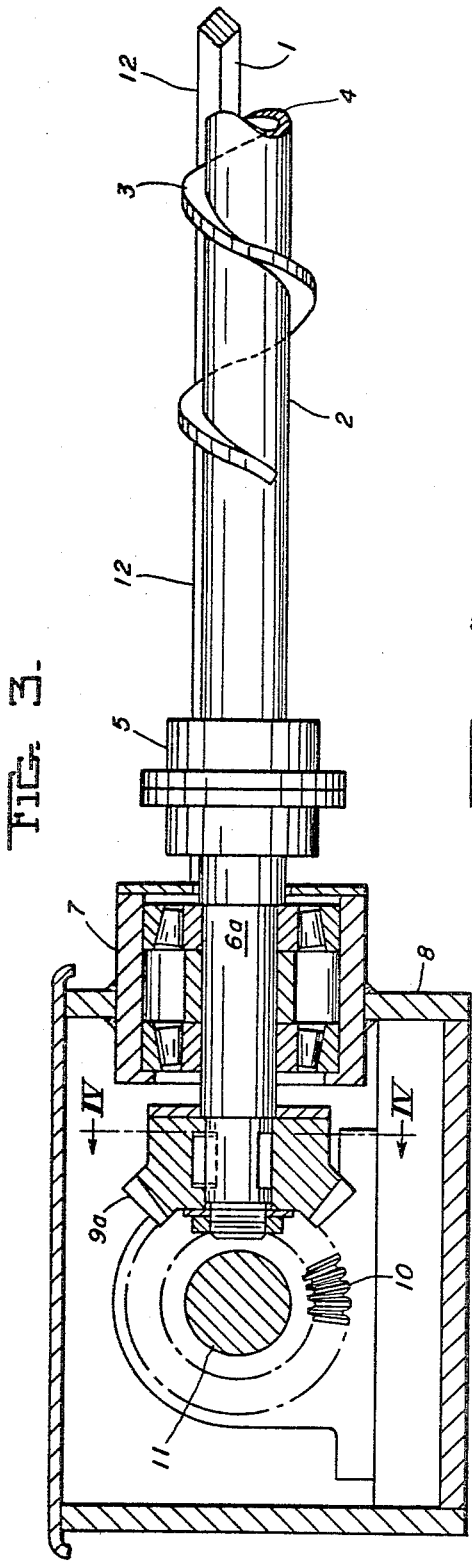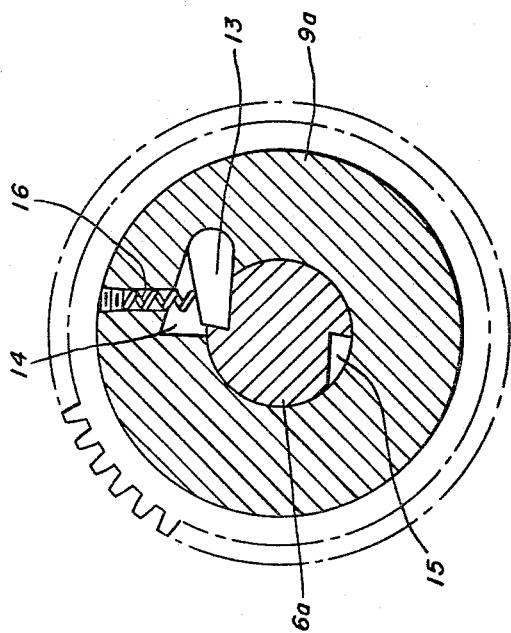

United States Patent Office 3,313,398
Patented Apr. 11, 1967

3,313,398
TRANSFER TABLE METHOD AND APPARATUS
Steve Andrews, Lorain, Ohio, assignor to United States Steel Corporation, a corporation of Delaware
Filed Aug. 26, 1964, Ser. No. 392,244
6 Claims. (Cl. 198—88)

This invention relates to transfer tables for moving elongated articles, such as pipe, in a sidewise direction from one location to another. It relates more particularly to pipe cooling beds and to a method and apparatus for moving pipe laterally over skids which form part of a cooling table at one side of a mill run-out conveyor. In a manner to be described, the invention enables a reduction in the length of cooling bed required for continuous tube mills that produce buttweld pipe in diameters varying over a wide range, for example, from one-half inch to four inches in diameter.

In continuous tube mills of the type mentioned above, the pipe after leaving the final mill pass is cut to lengths of 42 feet which are delivered to a cooling table by a run-out conveyor. At the cooling table each section of pipe is transferred laterally from the run-out conveyor to the cooling table skids, which are parallel and extend laterally from the run-out conveyor. Movement of the pipe over the cooling table skids is effected by conveyor mechanisms that extend in the direction of the skids and have pusher elements at equally spaced intervals along the lengths thereof for pushing engagement with the pipe. The conveyor mechanisms used for this purpose are usually either continuous conveyor chains in which the pipe pusher elements are dogs mounted on the chains, or screw conveyors in which the pipe pusher elements are provided by helically extending conveyor elements. In either case, each of the conveyor mechanisms has pushing engagement with each pipe on the cooling bed and the spacing of adjacent pipe along the cooling table skids is determined by the spacing of the pusher elements on the conveyor mechanisms, which in turn is determined by the helical pitch of the screw conveyors or the spacing between adjacent dogs on the conveyor chains. The cooling table must of course have a length such that the pipe will be supported thereon for a period of time sufficient for its cooling to a temperature at which it can be removed for further handling and processing without bending.

Generally, stated, the required length of pipe cooling bed is determined according to conventional design by the spacing that must be provided on the cooling bed for the largest diameter pipe and by the production rate of the smallest diameter pipe. In mills for producing the full-size range of standard pipe from ½" (.840" O.D.) to 4" (4.5" O.D.) inclusive, the cooling bed is designed to maintain the pipe on 7½" or 8" centers in order to provide sufficient space for efficient cooling of the largest size pipe to be processed. This space determines the pitch of the conveyor screws or the distance between pusher dogs on conveyor chains and is thus an inherent factor in the design of the cooling bed. It results in a fixed spacing (center to center of adjacent pipes) for all sizes of pipe and is of course greater than necessary for efficient cooling of the smaller sizes. The smaller sizes, moreover, are produced at much higher rates and, although they cool more rapidly, a larger number of cooling spaces are needed on the cooling bed to provide for their cooling to the proper temperature. The production rate of the smallest size thus determines the length of the bed.

The design requirements of a cooling bed will be best understood by relating them to a commercial tube mill which produces ½" pipe at the rate of 1000' per minute and 4" pipe at the rate of 125–150' per minute. Translated in terms of 42' long pieces, which is a common cutting multiple for buttweld pipe, the ½" pipe is produced at the rate of 24 pieces per minute and the 4" pipe at the rate of 3½ pieces per minute. Cooling from 1800° F. to 300° F. requires 26 minutes for the 4" pipe and 9 minutes for ½" pipe. With a conveyor spacing of 8" for the 4" pipe as explained above, the required length of cooling bed for the 4" pipe is 61', this dimension being obtained by multiplying the pieces per minute (3½), by the spacing in feet (8⁄12) and by the time in minutes (26) required for cooling. Since the conveyor spacing of 8" is fixed, the length of bed required for the ½" pipe is 24 (pieces per minute) times 8⁄12 (spacing) times 9 (cooling time), or 144'. From this is can be seen that the length of cooling bed is determined by the production rate of the smaller sizes of pipe. This condition is further aggravated by improved mill designs which provide for greater increases in the rate of production of the smaller sizes than for the larger sizes.

As indicated, one object of this invention is to reduce the length of a cooling bed for handling the entire output of a tube mill which produces a full-size range of commercial pipe of from ½" to 4". To this end, alternate conveyor mechanisms on the cooling bed are adjusted to move their pusher elements to positions in which they are arranged intermediate the pusher elements on the remaining conveyor mechanisms when smaller sizes of pipe are being produced. In this manner, the spacing between successive pipe moving over the cooling bed is cut in half for the smaller sizes of pipe, so that the overall length of bed is materially decreased compared to the length of conventionally designed beds. When larger sizes of pipe are to be produced, the alternate conveyor mechanisms on the cooling beds are adjusted to realign their respective pusher elements with the pusher elements on the remaining conveyor mechanisms, to thereby provide the maximum spacing between successive pipe on the cooling bed.

Other objects and advantages of the invention will be apparent from the following description and the accompanying drawings in which:

FIGURE 3 is a sectional view taken in a plane extending axially of one of the conveyor screws which shows one form of mechanism for adjusting the angular phase relation or rotational positions of alternate conveyor screws relative to the remaining conveyor screws; and FIGURE 4 is a sectional view taken substantially along the line IV—IV of FIGURE 3.

Figure 1:
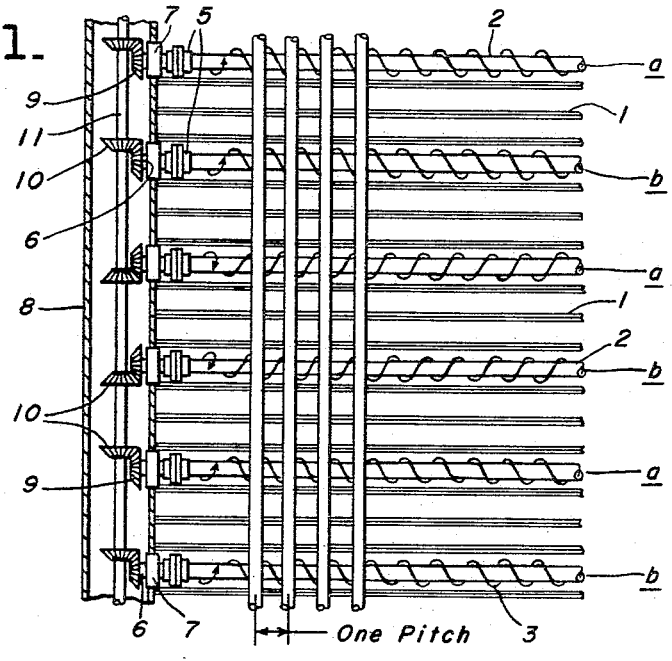
FIGURES 1 and 2 are fragmentary and somewhat diagrammatic plan views illustrating the manner in which a pipe cooling bed having screw conveyors for moving the pipe is constructed and operated in accordance with the principles of this invention.

The drawings show a conventional arrangement of parallel skids 1 and conveyor screws 2 in a cooling bed on which pipe is received from the final pass of a tube mill after it has been cut to length. Each of the screws 2 comprises a helical conveyor element 3 on a drive tube 4 which is connected by a coupling 5 with a drive shaft 6. Each of the shafts 6 is supported by end-thrust bearings 7 in a housing 8 and has a bevel gear 9 on one end thereof in meshing engagement with a bevel gear 10 on a common drive shaft 11, which extends axially through the housing 8 and is rotatable in reverse directions for a purpose to be described. The helical convyeor elements 3 project above the upper surfaces or edges 12 of the skids 1 for pushing engagement with the pipe supported thereon, but the tubes 4 are below the skid surfaces 12 and out of engagement with such pipe. According to conventional practice, the screws 2 occupy rotational positions that are aligned or angularly in phase with each other so that the pusher or conveyor element 3 on each has pushing engagement with each pipe being moved over the skids 1 as shown in FIGURE 1 of the drawings. When arranged in this manner, the lateral spacing of pipe on the cooling table is determined by the pitch of the conveyor elements 3. As stated above, the elements 3 must have a pitch of about 8" for cooling beds that handle 4" pipe. As further shown in FIGURES 1 and 2, the drive gears 9–10 for successive pairs of conveyor elements are arranged to rotate such pairs in opposite rotational directions and thus provide an equal number of clockwise and counter-clockwise rotating screws so that endwise movement will not be imparted to the pipes by frictional engagement of the pusher elements 3 therewith.

Figure 2:
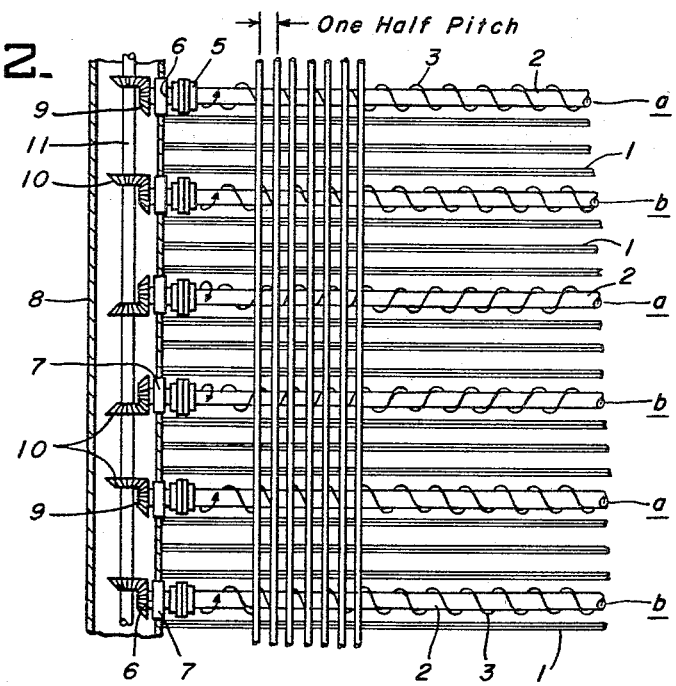

When smaller diameter pipe is being produced, the cooling bed is adjusted in accordance with the principles of this invention to reduce the spacing between adjacent pipe compared to the fixed spacing which is determined by the pitch of the helically extending pusher elements or screws 3 as described above. This is accomplished by adjusting alternate conveyors 2 so that the pusher elements 3 thereon engage alternate pipe as shown in FIGURE 2 of the drawings and is effected, more specifically, by rotating alternate conveyors 180° relative to the remaining conveyors so that the conveyor screws 3 on each pair of adjacent conveyors 2 will be 180° out of phase relative to each other. Adjustment of the conveyor screws 3 in this manner reduces the spacing between adjacent pipe to 4", or to half the pitch of the conveyor screws 3, and may be employed, for example, when the pipe has a diameter of 2½" or less. This adjustment thus renders the cooling bed effective to handle twice as many pieces of the smaller diameter pipe and doubles the capacity of the bed compared to the arrangement shown in FIGURE 1. From this it will be apparent that the cooling table need be only half as long to obtain the same final cooling temperature, or conversely, it can be stated that cooling time available is 100% greater on a cooling bed arranged as shown in FIGURE 2 compared to the arrangement shown in FIGURE 1. When pipe having a larger diameter is being produced, the alternate conveyors 2 are readjusted to positions in which they are in phase with the remaining conveyors and to thus increase the spacing of the pipe in the bed to the maximum of 8".

In order that adjustment of the spacing between adjacent pipe on the cooling bed may be made, alternate screw conveyors $a$ are equipped with an escapement device in the nature of an overrunning clutch in their driving connections with the drive shaft 11, for example, as shown between the bevel gear 9a and the shaft 6a as shown in FIGURES 3 and 4 of the drawings. The escapement device or over-running clutch shown in these figures comprises an indexing pawl 13 confined in a contoured cavity 14 in the hub of the bevel gear 9a. The contour of the cavity 14 provides for pivotal or swinging movement of the pawl 13 to and from an operative driving position in which it is seated in or has driving engagement in one of a pair of notches 15 on the shaft 6a. A spring 16 biases the movement of the pawl 13 to a position in which it has driving engagement in one of the shaft notches 15. The notches 15 are spaced 180° apart to provide the required adjustment of the positions of the conveyor screws 2. This mounting of the pawls 13 provides for free rotational movement of the gear 9a in a clockwise direction relative ot the drive shaft 6a as viewed in FIGURE 4. In this manner rotational movement of the drive shaft 11 in a clockwise direction as viewed in FIGURE 3 operates to rotate the gear 9a relative to its drive shaft 6a without imparting movement to the conveyor screw driven thereby. The escapement devices for alternate ones of the $a$ conveyors are of course reversed due to the reverse rotation of such conveyors. The gears 9 on the remaining screws $b$ have keyed or other fixed connections on their respective drive shafts 6 so that they rotate in both directions with the drive shaft 11. When adjustment of the relative rotational positions of the conveyor screws 2 is required, rotation of the common drive shaft 11 in a clockwise direction through an angle of 180° is all that is required. As this rotation of the shaft 11 takes place, the conveyor screws $a$ do not rotate and as a consequence there is no change in the position of the conveyor elements 3 on the alternate conveyors $a$. The conveyor elements 3 on the remaining conveyors $b$, however, rotate with the shaft 11 and their angular phase positions are changed relative to the conveyors $a$. Upon subsequent rotation of the shaft 11 in an opposite direction, the pawls 13 drop into the shaft notches 15 so that continued rotation of the shaft 11 operates all of the conveyors $a$ and $b$ to move pipe over the conveyor skids 1.

It will of course be understood that the provision of escapement devices in the form of the over-running clutch pawls 13 in the drives for the alternate screw conveyors $a$ represents a preferred practice of the invention, and that other mechanisms for adjusting the relative position of the pusher elements 3 may be used and are contemplated. For example, such adjustment may be made by sliding the alternate conveyor screws $a$ in an axial direction, either forward or backward, a distance equal to one-half the pitch of the conveyor elements 3 and, in such case, the necessary splined connections, slide bearings, etc. required in the drives for the alternate conveyors $a$ would be provided. As further indicated above, the principles of the invention are applicable to cooling beds using other forms of conveyor mechanisms, for example, conveyor chains having pusher elements in the form of dogs at spaced intervals along the lengths thereof. In such case, adjustment of the pusher dogs on alternate conveyors $a$ would be made by moving the chains of such conveyors relative to the chains of the remaining conveyors a distance equal to one-half the spacing of the dogs on such chains.

From the foregoing it will be apparent that the method and apparatus of this invention by providing for adjustment of the spacing between successive pipe on a cooling bed reduce the size of cooling bed that is required for handling buttweld pipe of different sizes varying over the standard range from ½" to 4". Attention is particularly directed to the fact that according to the preferred practice of the invention the conveyor mechanisms are arranged in two groups $a$ and $b$ in each of which the conveyor mechanisms are spaced laterally relative to each other at uniform distances over the width of the bed, there being at least a pair of laterally spaced conveyor mechanisms in each of the groups $a$ and $b$, and that by using the conveyor mechanisms in such groups alternately to move successive pipe over the bed, the spacing between successive pipe on the bed for the smaller sizes of pipe is cut in half. In this manner, the production capacity of the bed for such smaller sizes is increased without any sacrifice in cooling efficiency.

While the above description and accompanying drawings disclose a preferred practice of the invention, it will be apparent that other adaptations and modifications may be made without departing from the scope of the following claims.

I claim:

1. In a conveyor for moving elongated articles laterally over a transfer table such as a pipe cooling bed and the like, a plurality of conveyor mechanisms having pusher elements at equally spaced intervals along the lengths thereof for moving the articles over said table, said conveyor mechanisms being adapted for operation with the said pusher elements thereon in laterally aligned positions whereby an article being moved is engaged by a pusher element in each of said mechanisms and the spacing between said articles on said table corresponds to the spacing between said pusher elements along said conveyor mechanisms, and means for adjusting the pusher elements on selected ones of said conveyor mechanisms to positions in which they are out of lateral alignment with and arranged between the pusher elements on the remaining ones of said conveyor mechanisms whereby articles moving over said table are engaged only by the pusher elements on said selected conveyor mechanisms or on said remaining conveyor mechanisms, and the spacing between articles on said table is a fractional part of the spacing between the pusher elements along said conveyor mechanisms.

2. In a conveyor mechanism for moving elongated articles laterally over a transfer table such as a pipe cooling bed and the like, a plurality of parallel conveyor screws adapted for operation in angular positions in phase with each other whereby an article moving over said bed is engaged by each of said screws and the spacing of said articles on said table corresponds to the pitch of said screws, and means for adjusting selected ones of said screws to angular positions out of phase with the remainder of said screws whereby successive articles moving over said table are engaged alternately by said selected screws and by said remaining screws, and the spacing of said articles on said table is a fractional part of the pitch of said screws.

3. A transfer table screw conveyor as defined by claim 2 characterized by said selected screws and remaining screws being arranged alternately relative to each other.

4. A transfer table screw conveyor as defined by claim 2 characterized further by the angular phase difference between said selected screws and said remaining screws being 180°.

5. In a conveyor mechanism for moving elongated articles laterally over a transfer table such as a pipe cooling bed and the like, a plurality of parallel conveyor screws having helically extending conveyor elements for moving engagement with the articles to be moved over said table, said screws being adapted for operation with said helically extending conveyor elements arranged in angular positions in phase with each other whereby an article being moved by said mechanism is engaged by each of said elements and the spacing between said articles on said table corresponds to the pitch of said conveyor elements, and means for adjusting selected ones of said screws to angular positions in which their said conveyor elements are out of phase with the remaining ones of said screws whereby articles moving over said table are engaged only by the conveyor elements on said selected screws or on said remaining screws and the spacing between articles on said bed is a fractional part of the pitch of said conveyor elements.

6. A transfer table conveyor mechanism as defined in claim 5 characterized by the said adjusting means comprising a reversible common drive means for simultaneously rotating all of said conveyor screws in one rotational direction to move said articles over said table, and means including an over-running clutch connecting each of said selected ones of said screws with said common drive means to provide for rotation of said remaining screws in an opposite rotational direction without rotation of said selected screws in response to reverse operation of said common drive means.

References Cited by the Examiner
UNITED STATES PATENTS 1,383,593 7/1921 Bennett _____ 198—213 X
2,618,385 11/1952 Silver et al. _____ 209—107

EVON C. BLUNK, *Primary Examiner.*

R. J. HICKEY, *Assistant Examiner.*